May 17, 1932.  C. J. SCHNEIDER  1,858,790

FOOD BREAKER

Filed Sept. 21, 1931

Inventor
Cale J. Schneider

Patented May 17, 1932

1,858,790

UNITED STATES PATENT OFFICE

CALE J. SCHNEIDER, OF TOLEDO, OHIO

FOOD BREAKER

Application filed September 21, 1931. Serial No. 563,933.

My invention relates to a device for dissecting or dividing food into parts or sizes convenient for the eating or serving of the food. The invention particularly relates to a utensil having portions which are adapted to move easily through the food without compressing or crushing the food, and which are so related to each other that upon lateral or angular movement, with respect to the body of the food, portions of the food will be broken or torn from the body of the food.

The invention has for its object to provide a utensil having a plurality of extending elements or pins which may be easily inserted into the body of the particular food desired to be partitioned, and a means for moving the extending elements or pins to break or separate portions of the food located on opposite sides of the extending elements. Another object of the invention is to provide an instrument having a supporting means for a plurality of extending elements or tines whereby the pins may be inserted into the food and moved to break or separate portions of the food located on opposite sides of the pins away from each other.

A still further object of the invention is to provide a plurality of extending elements or pins of such shape that the food will present substantially no resistance to the insertion of the tines into the food and yet are so related in position to each other as to resist movement of the food between the tines when the pins are moved angularly with respect to, or away from, the main body of the food.

The invention consists in other features and advantages which will appear from the following description and upon examination of the drawings. Structures containing the invention may partake of different forms and may be varied in their details and still embody the invention. To illustrate a practical application of the invention, I have selected a food breaker utensil embodying the invention as an example of the various structures, and details thereof, that contain the invention, and shall describe the selected structure hereinafter, it being understood that variations may be made without departing from the spirit of the invention. The particular structure selected is shown in the accompanying drawings.

Figure 1:
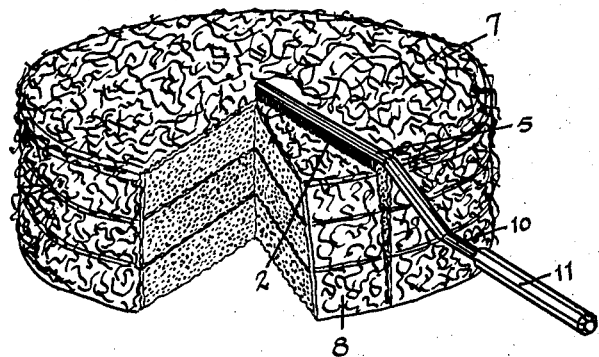
Figure 2:
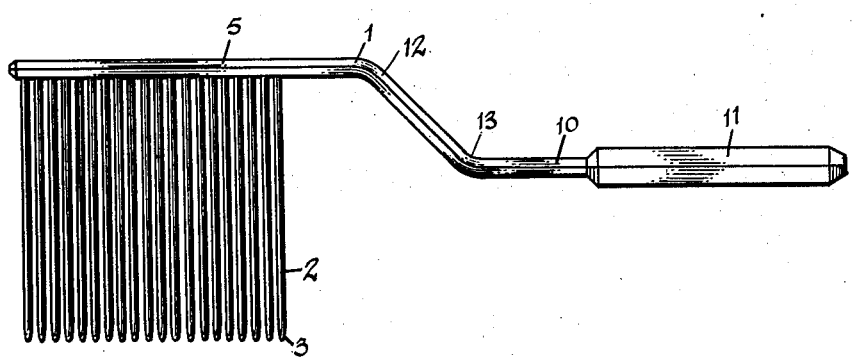
Figure 3:
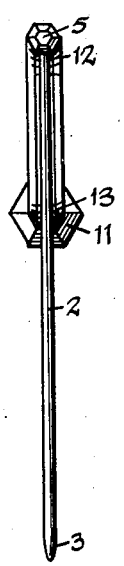

Fig. 1 of the accompanying drawings illustrates a food breaker in operation upon a cake. Fig. 2 illustrates a side view of the food breaker. Fig. 3 illustrates an end view of the food breaker.

As is well known, it is common practice in the dividing of foods, such as cake and the like, to cut the cake with a knife. Such methods are objectionable, especially in connection with spongy cakes and foods, for, in order to establish a sufficient frictional force and resistance necessary for the cutting action of the knife, the food must necessarily be compressed by the knife edge. Also portions of the food being cut will cling to the sides of the knife, as is the case in cutting foods having gummy characteristics. The compressing of the cake or other foods incidental to cutting destroys its aerated spongy condition or lightness and fluffiness which characteristics are desirable in cakes and similar foods. The knife also tends to break portions of the food into crumbs and small particles, thereby destroying regularity and form of the piece cut, especially when the food is cut in thin slices. Much time and expense is often put forth in order to obtain a well aerated or fluffy cake, only to have these characteristics lost in the dividing of the cake for use and consumption.

By the use of my invention the food or cake may be divided in sections or pieces of any defined dimension or form as desired, without compressing the food or cake or causing it to lose any of its aerated or fluffy characteristics or crumble in the dividing operation. The invention provides a plurality of extending elements or tines which are supported on a bracket or arm, the arm preferably having a handle by which the pins may be operated.

In the device illustrated in the drawings, the instrument 1 is provided with a plurality of tines or pins 2. The pins 2 may be flattened in cross section but are preferably cylindrical in shape and may have sharpened ends 3. The pins may be supported in alignment with each other on a supporting arm 5 and are so located on the supporting arm 5 as to be relatively close to one another. Thus, the pins 2 may easily be inserted into the food, such as the cake 7, along such a line at which it is desired to partition or divide the cake. The pins may then be moved away from the body of the cake, dividing therefrom a portion or piece 8, as shown in Fig. 1.

In order to provide a means for readily moving the pins into the food, and subsequent thereto, moving the pins away from the body of the food to divide the food into parts, the arm 5 may be provided with, and moved by, the handle 10. The handle 10 may have fluted portions 11 which provide a convenient grasping surface for the user of the instrument. Preferably, the handle 10 is bent angularly with respect to the arm 5, as at 12 and 13, to locate the fluted portion 11 on a line parallel with the line of the arm 5 and on a line substantially midway the length of the tines 2. By thus locating the fluted portion 11, the hand of the user, in operation of the instrument, will be located substantially centrally with respect to the piece 8 of the food or cake 7 to be partitioned and thus directs the force applied, by the hand of the user, centrally with respect to the food in breaking the piece 8 from the cake. Preferably, the handle is moved angularly or rotated slightly in the user's hand with respect to the body of the food to move the pins 2 and arm 5 through a short arc about the ends 3 of the pins. By so operating the instrument in this manner, the piece 8 will be gradually torn from the body of the cake, the top portions of the piece being moved first, as illustrated in Fig. 1.

The device 1 may be further used as a convenient server of the particular piece cut, as portions of the food will be yieldingly held between the tines 2 to maintain the piece on the device.

Thus, I have presented an instrument or device which may be moved through the food without compressing or de-aerating the food and without crumbling the food, and which may be moved with respect to the body of the food to divide the food into portions or parts, as may be desired.

I claim:

1. In a utensil for dividing foods, an arm having a handle portion located at one end of the arm, a plurality of straight parallel pins extending from the arm at closely spaced points in a direction transverse to the length of the arm and substantially in a plane common to the plane of the handle portion and forming means for puncturing and penetrating the food and for dividing the food along a plane defined by the pins.

2. In a utensil for dividing food materials, an arm having a handle portion located at one end of the arm, a plurality of parallel closely spaced straight pins connected to the other end of the arm and extending in a direction transverse to the length of the arm and substantially in a plane common to the plane of the handle portion, the cross sections of the pins being substantially uniform in size throughout their length, and the lengths of the pins being substantially the same.

3. In a utensil for dividing foods, an arm having a handle portion located at one end of the arm, a plurality of straight parallel pins extending from closely spaced points along substantially the entire length of the arm in a direction transverse to the length of the arm and substantially in a plane common to the plane of the handle portion and forming means for puncturing and penetrating the food and for dividing the food along the plane defined by the pins.

4. In a utensil for dividing foods comprising a hand supported and operated one-piece device having an arm, a handle located at one end of the arm, a plurality of short parallel pins extending from the arm at closely spaced points in a direction transverse to the length of the arm and forming means for puncturing and penetrating the food at closely spaced points and for dividing the food along the plane defined by the pins.

5. In a utensil for dividing foods comprising a hand supported and operated one-piece device having an arm, a plurality of short parallel pins extending from the arm at closely spaced points in a direction transverse to the length of the arm, a handle having bent portions connected to the arm for locating the handle substantially parallel to the arm and substantially mid-way the length of the pins.

In witness whereof I have hereunto signed my name to this specification.

CALE J. SCHNEIDER.